United States Patent
Pometun et al.

(10) Patent No.: US 11,048,959 B2
(45) Date of Patent: Jun. 29, 2021

(54) APPARATUS AND METHOD FOR INFINITELY REPRODUCING FRAMES IN ELECTRONIC DEVICE

(71) Applicant: SAMSUNG ELECTRONICS CO., LTD., Suwon-si (KR)

(72) Inventors: Sergiy Pometun, Kyiv (UA); Oleksii Kulakov, Kyiv (UA); Andrii Malyshev, Kyiv (UA); Andriy Fisunenko, Kyiv (UA); Mykhailo Zlotnyk, Kyiv (UA); Oleksandr Viatchaninov, Kyiv (UA); Vadym Stupakov, Kyiv (UA); Valerii Dziubliuk, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 16/365,888

(22) Filed: Mar. 27, 2019

(65) Prior Publication Data

US 2020/0104624 A1 Apr. 2, 2020

(30) Foreign Application Priority Data

Oct. 2, 2018 (KR) .......................... 10-2018-0117735

(51) Int. Cl.
*G06T 11/60* (2006.01)
*G06T 13/20* (2011.01)
(Continued)

(52) U.S. Cl.
CPC .............. *G06K 9/3241* (2013.01); *G06T 7/11* (2017.01); *G06T 11/60* (2013.01); *G06T 13/20* (2013.01); *G06T 13/80* (2013.01); *G06T 19/006* (2013.01)

(58) Field of Classification Search
CPC ........... G06K 9/00671; G06K 9/00744; G06K 9/3241; G06T 97/11; G06T 13/20;
(Continued)

(56) References Cited

U.S. PATENT DOCUMENTS

2002/0093539 A1* 7/2002 Os ........................ G06F 3/0482
 715/810
2006/0285021 A1* 12/2006 Chao ........................ H04N 5/63
 348/730

(Continued)

FOREIGN PATENT DOCUMENTS

EP 2 321 973 B1 5/2018

OTHER PUBLICATIONS

"Idyllic waterfall and serene environment of wild tropical forest in Thailand. Water stream flows through wet stones and tree roots and exotic plants growth around. Nature paradise 4k video background", Storyblocks, 2018, total 1 page, https://www.videoblocks.com/video/idyllic-waterfall-and-serene-environment-ofwild-tropical-forest-in-thailand-waterstream-flows-through-wet-stones-andtree-roots-and-exotic-plants-growtharound-nature-paradise-4k-videobackground-e2nOlfkul.

(Continued)

*Primary Examiner* — Yubin Hung
(74) *Attorney, Agent, or Firm* — Sughrue Mion, PLLC

(57) ABSTRACT

A method for reproducing frames in an electronic device may include detecting at least one animation region selected from a plurality of animation regions, determining a plurality of random sequences for the at least one selected animation region, generating an output sequence by applying weights to the determined random sequences, and reproducing the generated output sequence.

20 Claims, 14 Drawing Sheets

(51) Int. Cl.
  *G06T 13/80* (2011.01)
  *G06T 19/00* (2011.01)
  *G06K 9/32* (2006.01)
  *G06T 7/11* (2017.01)

(58) Field of Classification Search
  CPC ......... G06T 13/80; G06T 19/006; G06T 7/11; G06T 11/60; G06T 2207/20212
  See application file for complete search history.

(56) References Cited

U.S. PATENT DOCUMENTS

| | | | |
|---|---|---|---|
| 2009/0273613 A1* | 11/2009 | Subherwal | G06T 11/00 345/634 |
| 2011/0038612 A1 | 2/2011 | Joffe et al. | |
| 2014/0044412 A1* | 2/2014 | Koshel | G06T 13/80 386/278 |
| 2014/0137052 A1* | 5/2014 | Hernandez | G06F 9/451 715/863 |
| 2015/0324096 A1 | 11/2015 | Leblanc et al. | |
| 2016/0104510 A1* | 4/2016 | Tamir | H04N 5/23245 386/223 |
| 2016/0134945 A1 | 5/2016 | Gower et al. | |
| 2017/0017616 A1 | 1/2017 | Elings et al. | |
| 2017/0039809 A1* | 2/2017 | Okada | G07F 17/3209 |
| 2017/0285922 A1 | 10/2017 | Leblanc et al. | |
| 2017/0294051 A1 | 10/2017 | Harviainen | |

OTHER PUBLICATIONS

"[P] Generative Ramen : MachineLearning", Reddit, Dec. 2018, total 10 pages, https://www.reddit.com/r/MachineLearning/comments/8l5w56/p_generative_ramen/.

International Search Report (PCT/ISA/210) dated Jul. 3, 2019 by the International Searching Authority in counterpart International Patent Application No. PCT/KR2019/003394.

Written Opinion (PCT/ISA/237) dated Jul. 3, 2019 by the International Searching Authority in counterpart International Patent Application No. PCT/KR2019/003394.

* cited by examiner

Frame generation block:

Given $Y = \varepsilon_0, \varepsilon_1, \ldots, \varepsilon_{n-1}$ and $\psi = \psi_0, \psi_1, \ldots, \psi_{n-1}$ generate next n output frames
$S_0, S_1, \ldots, S_{n-1}$
Let denote $k$ = n_smooth_frames 1. For each t from 0 to n-1 : generate output frame $\varepsilon_t$ and $\psi_t$ from frames $P_t$ by executing process a - d :

a. $\varepsilon_t$ is known linear combination of k initial frames $\varepsilon_t = \sum_{i=0}^{k-1} w_i(t) \cdot f_{A+r+i}$ $\psi_t$ is known linear combination of k initial frames $\psi_t = \sum_{i=0}^{k-1} w_i(t) \cdot f_{B+j+i}$ with the same weight but different starting frames $f_{B_i}$.

b. changeover weight $w = t/n$ set c. $r(t)$ is the minimum number such that $\sum_{i=0}^{r} w_i \geq w$, and $\Delta = \sum_{i=0}^{r} w_i - w$ d. output frame
      $$s_t = \sum_{i=0}^{r(t)-1} w_i(t) \cdot f_{B+i} + (w_{r(t)} - \Delta) \cdot f_{B+r(t)} + \Delta \cdot f_{A+r(t)} + \sum_{i=r(t)+1}^{k-1} w_i(t) \cdot f_{A+i}$$

|    | s0  | s1  | s2  | s3  | s4  | s5  | s6  | s7  | s8  | s9  | s10 | s11 | s12 | s13 | s14 | s15 | s16 | s17 | s18 | s19 | s20 | s21 | s22 |
|----|-----|-----|-----|-----|-----|-----|-----|-----|-----|-----|-----|-----|-----|-----|-----|-----|-----|-----|-----|-----|-----|-----|-----|
| f0 | 0.5 | 0.3 | 0.1 |     |     |     |     |     |     |     |     |     |     |     |     |     |     |     |     |     |     |     |     |
| f1 | 0.5 | 0.5 | 0.5 | 0.4 | 0.2 |     |     |     |     |     |     |     |     |     |     |     |     |     |     |     |     |     |     |
| f2 | 0   | 0.2 | 0.4 | 0.5 | 0.5 | 0.5 | 0.3 | 0.1 |     |     |     |     |     |     |     |     |     |     |     |     |     |     |     |
| f3 |     |     |     | 0.1 | 0.3 | 0.5 | 0.5 | 0.5 | 0.4 | 0.2 |     |     |     |     |     |     |     |     |     |     |     |     |     |
| f4 |     |     |     |     |     | 0   | 0.2 | 0.4 | 0.5 | 0.5 | 0.5 | 0.3 | 0.1 |     |     |     |     |     |     |     |     |     |     |
| f5 |     |     |     |     |     |     |     |     | 0.1 | 0.3 | 0.5 | 0.5 | 0.5 | 0.4 | 0.2 |     |     |     |     |     |     |     |     |
| f6 |     |     |     |     |     |     |     |     |     | 0   | 0.2 | 0.4 | 0.5 | 0.5 | 0.5 | 0.3 | 0.1 |     |     |     |     |     |     |
| f7 |     |     |     |     |     |     |     |     |     |     |     |     | 0.1 | 0.3 | 0.5 | 0.5 | 0.5 | 0.4 | 0.2 |     |     |     |     |
| f8 |     |     |     |     |     |     |     |     |     |     |     |     |     |     | 0   | 0.2 | 0.4 | 0.5 | 0.5 | 0.5 | 0.3 | 0.1 |     |
| f9 |     |     |     |     |     |     |     |     |     |     |     |     |     |     |     |     |     | 0.1 | 0.3 | 0.5 | 0.5 | 0.5 |     |
| f10|     |     |     |     |     |     |     |     |     |     |     |     |     |     |     |     |     |     |     |     | 0   | 0.2 | 0.4 |

APPARATUS AND METHOD FOR INFINITELY REPRODUCING FRAMES IN ELECTRONIC DEVICE

CROSS-REFERENCE TO RELATED APPLICATION(S)

This application is based on and claims priority under 35 U.S.C. § 119 to Korean Patent Application No. 10-2018-0117735, filed on Oct. 2, 2018, in the Korean Intellectual Property Office, the disclosure of which is incorporated by reference herein in its entirety.

FIELD

The disclosure relates generally to an electronic device. More particularly, the disclosure relates to an apparatus and a method for infinitely generating and reproducing frames.

DESCRIPTION OF RELATED ART

The Internet is rising as a new industry, and accordingly various services and business are active. In particular, multimedia functions and effects are remarkably growing, and, for example, content for augmented reality (AR) devices, virtual reality (VR) devices, and television (TV) panels draw the attention of consumers.

Such content may be created generally using a video (e.g., flat or 360 degrees), and may be generated by drawing and rendering three-dimensional (3D) contents. Yet, a new content form is demanded to enhance user immersion.

SUMMARY

To address the above-discussed deficiencies of the prior art, an aspect of the disclosure is to provide an apparatus and a method for generating and reproducing frames infinitely.

Another aspect of the disclosure is to provide an apparatus and a method for changing a playback speed while reproducing frames.

Yet another aspect of the disclosure is to provide an apparatus and a method for reproducing frames to smoothly represent a common border between animation regions.

According to various embodiments of the disclosure, a method for reproducing frames in an electronic device may include detecting at least one animation region selected from a plurality of animation regions, determining a plurality of random sequences for the at least one selected animation region, generating an output sequence by applying weights to the determined random sequences, and reproducing the generated output sequence.

According to various embodiments of the disclosure, an electronic device for reproducing frames may include a display unit and at least one processor connected to the display unit, and the at least one processor may be configured to detect at least one animation region selected from a plurality of animation regions, to determine a plurality of random sequences for the at least one selected animation region, to generate an output sequence by applying weights to the determined random sequences, and to reproduce the generated output sequence.

According to various embodiments of the disclosure, a method for reproducing frames in an electronic device may include detecting at least one animation region selected from among a plurality of animation regions; determining a plurality of random sequences of frames for the at least one selected animation region; applying respective weights to each random sequence of frames from among the determined plurality of random sequences of frames; generating an output sequence of frames based on the weighted random sequences of frames; and reproducing the generated output sequence of frames.

The generating the output sequence of frames may include changing the determined plurality of random sequences of frames by moving respective start frames of each random sequence of frames from among the determined plurality of random sequences of frames to another frame of the random sequence of frames; and generating another output sequence of frames based on the plurality of changed random sequences of frames.

The generating the output sequence of frames may include determining a plurality of weighted sequences based on parameters predetermined from the determined plurality of random sequences of frames; setting respective transition weights for each weighted sequence from among the determined plurality of weighted sequences; and generating the output sequence of frames based on the determined plurality of weighted sequences and the respective transition weights.

The generating the output sequence of frames may include selecting a shortest weighted sequence from among the determined plurality of weighted sequences; and adjusting respective lengths of the determined plurality of weighted sequences to correspond to a length of the selected shortest weighted sequence.

The generating the output sequence of frames may include determining respective weights for each of a plurality of original frames based on a playback speed and a predetermined parameter; and generating the output sequence of frames based on the predetermined parameter and the weights.

The method may further include determining whether a sum of a current frame number and the predetermined parameter exceeds a total number of the plurality of original frames, the current frame number corresponding to an output frame currently being generated; if the sum of the current frame number and the predetermined parameter is less than or equal to the total number of the plurality of original frames, increasing the current frame number by one; changing the determined weights based on the predetermined parameter and the playback speed; and generating an output frame corresponding to the current frame number increased by one based on the predetermined parameter and the changed weights.

The method may further include, if the playback speed is changed, changing the weights for the plurality of original frames based on the changed playback speed and the predetermined parameter, according to the changed playback speed.

The reproducing the generated output sequence of frames may further include selecting two animation regions having a common border from among the plurality of animation regions; calculating a pixel value at the common border of the two selected animation regions while the generated output sequence of frames is reproduced; and reproducing the generated output sequence of frames based on the calculated pixel value.

The calculating the pixel value at the common border of the two selected animation regions while the generated output sequence of frames is reproduced may further include selecting a transition size for the two selected animation regions; calculating respective proximity values for each pixel at the common border of the two selected animation regions; and calculating respective pixel values for each pixel at the common border of the two selected animation regions while the generated output sequence of frames is reproduced based on the calculated proximity values, wherein a proximity value for a pixel is a ratio of a first pixel amount inside a first circle having a first radius equal to the selected transition size, the first circle covering one of the two selected animation regions, to a second pixel amount inside a second circle having a second radius equal to the selected transition size, the second circle covering the other of the two selected animation regions.

Playback of the selected at least one animation region may be turned on/off by a user.

According to various embodiments of the disclosure, an electronic device for reproducing frames may include a display unit; and at least one processor connected to the display unit, wherein the at least one processor is configured to detect at least one animation region selected from among a plurality of animation regions, determine a plurality of random sequences of frames for the at least one selected animation region, apply respective weights to each random sequence of frames from among the determined plurality of random sequences of frames, generate an output sequence of frames based on the weighted random sequences of frames, and reproduce the generated output sequence of frames.

The at least one processor may be configured to change the determined plurality of random sequences of frames by moving respective start frames of each random sequence of frames from among the determined plurality of random sequences of frames to another frame of the random sequence of frames, and generate another output sequence of frames based on the plurality of changed random sequences of frames.

The at least one processor may be configured to determine a plurality of weighted sequences based on parameters predetermined from the determined plurality of random sequences of frames, set respective transition weights for each weighted sequence from among the determined plurality of weighted sequences, and generate the output sequence of frames based on the determined plurality of weighted sequences and the respective transition weights.

The at least one processor may be configured to select a shortest weighted sequence from among the determined plurality of weighted sequences, and adjust respective lengths of the determined plurality of weighted sequences to correspond to a length of the selected shortest weighted sequence.

The at least one processor may be configured to determine weights for initial frames based on a playback speed and a predetermined parameter, and to generate the output sequence of frames based on the predetermined parameter and the weights.

The at least one processor may be configured to determine whether a sum of a current frame number and the predetermined parameter exceeds a total number of the initial frames, if the sum of the current frame number and the predetermined parameter is less than or equal to the total number of the initial frames, to increase the current frame number by one, to change the weights based on the predetermined parameter and the playback speed, and to generate an output frame corresponding to the current frame number increased by one based on the predetermined parameter and the changed weights.

The at least one processor may be configured to, if the playback speed is changed, change weights for the initial frames based on the changed playback speed and the predetermined parameter, according to the changed playback speed.

The at least one processor may be configured to select two animation regions having a common border from among the plurality of animation regions, calculate a pixel value at the common border of the two selected animation regions while the generated output sequence of frames is reproduced, and reproduce the generated output sequence of frames based on the calculated pixel value.

The at least one processor may be configured to select a transition size for the two selected animation regions, calculate a proximity value for the two selected animation regions, and calculate the pixel value at the common border of the two selected animation regions while the generated output sequence of frames is reproduced based on the calculated proximity value, wherein the proximity value is a ratio of a first pixel amount inside a first circle having a first radius equal to the selected transition size, the first circle covering one of the two selected animation regions, to a second pixel amount inside a second circle having a second radius equal to the selected transition size, the second circle covering the other of the two selected animation regions.

The at least one processor may be configured to control reproduction of the selected at least one animation region to be turned on/off by a user.

According to various embodiments of the disclosure, a method for reproducing frames in an electronic device may include setting an animation region within a sequence of a plurality of original frames; and generating an output sequence including a plurality of output frames based on the animation region, wherein each output frame from among the plurality of output frames is a linear combination of original frames, and wherein the generating the output sequence comprises: determining a plurality of random sequences of the plurality of original frames; determining respective weight sequences for each random sequence from among the plurality of random sequences; generating the output sequence based on the determined weight sequences.

The method may further include changing the determined plurality of random sequences by moving respective start frames of each random sequence from among the determined plurality of random sequences to another frame; determining respective changed weight sequences for each changed random sequence from among the plurality of changed random sequences; and generating a second output sequence based on the plurality of changed random sequences.

A length of a first random sequence from among the plurality of random sequences may be one half a length of a second random sequence from among the plurality of random sequences.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 illustrates a detailed frame generation block in an interactive content reproduction algorithm according to various embodiments of the disclosure;

FIG. 9 illustrates a linear combination of frames weighted in interactive content reproduction according to various embodiments of the disclosure;

FIG. 10 illustrates another linear combination of frames weighted in interactive content reproduction according to various embodiments of the disclosure;

FIG. 13 illustrates a linear combination of frames with a playback speed changed in interactive content reproduction according to various embodiments of the disclosure.

Throughout the drawings, like reference numerals will be understood to refer to like parts, components and structures.

DETAILED DESCRIPTION

Figure 1:
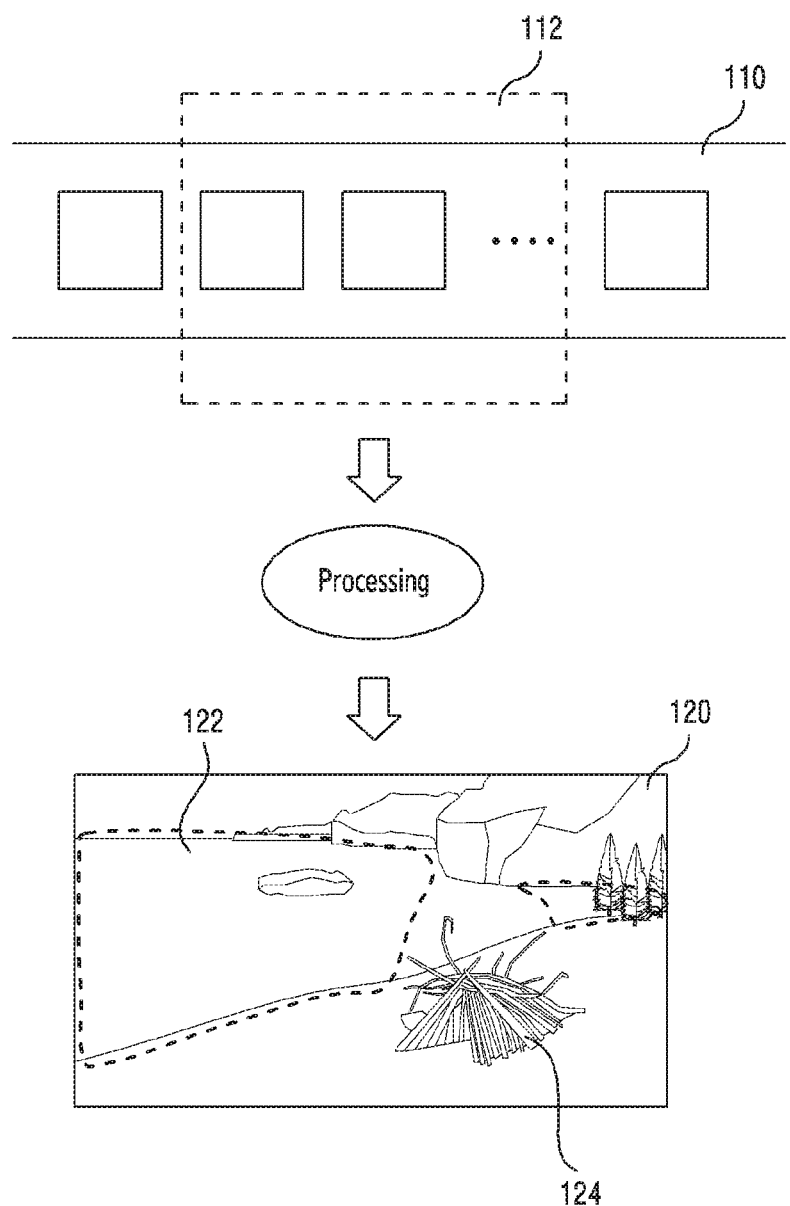
FIG. 1 illustrates interactive content creation and reproduction according to various embodiments of the disclosure.

Terms used in the disclosure are used for describing particular embodiments and are not intended to limit the scope of other embodiments. A singular form may include a plurality of forms unless it is explicitly differently represented. All the terms used herein, including technical and scientific terms, may have the same meanings as terms that are generally understood by those skilled in the art to which the disclosure pertains. Terms used in the disclosure may be interpreted to have meanings similar to those defined in a general dictionary and, unless explicitly defined in the disclosure, shall not be interpreted in an excessively formal manner. In some cases, even when terms are defined in this disclosure the terms should not be interpreted to exclude the embodiments of the disclosure.

In various embodiments of the disclosure to be described below, a hardware approach will be described as an example. However, since the various embodiments of the disclosure include a technology using both hardware and software, the various embodiments of the disclosure do not exclude a software-based approach.

Various embodiments of the disclosure provide an apparatus and a method for infinitely generating and reproducing frames selected in an electronic device. Specifically, a method for reproducing frames selected in an electronic device may repeat detecting at least one animation region selected from a plurality of animation regions of interactive content, generating an output sequence for the at least one selected animation region, reproducing the generated output sequence until a pause command occurs, and generating another output sequence for the at least one selected animation region.

Now, a technique for infinitely generating and reproducing frames selected in an electronic device is explained.

Terms indicating signals, terms indicating channels, terms indicating control information, terms indicating network entities, and terms indicating components of a device, which are used in the following description, are for the sake of explanation. Accordingly, the disclosure is not limited to the expressly recited terms, and may contemplate the use of other terms having the same technical meaning.

Various embodiments to be explained relate to interactive content. According to the interactive content according to various embodiments, a user may interact with content (e.g., creating clouds moving in the sky) on a display device (e.g., an augmented reality (AR) device, a virtual reality (VR) device, a television (TV)). For example, at least part of the interactive content may switch from a first state to a second state according to the interaction with the user, and may return to the first state according to another interaction. Specifically, at least part of the interactive content may become a moving picture according to a user's selection. According to the interactive content according to various embodiments, content which interacts with the user may be created by capturing a real world image (e.g., a natural phenomenon, people, streets, etc.). That is, the interactive content may be created from images or videos captured from the real world. According to the interactive content according to various embodiments, content which interacts with the user may be continually animated (e.g., moving clouds, running water, smiling people, etc.). Hence, the interactive content may be referred to as interactive realistic living content.

FIG. 1 illustrates interactive content creation and reproduction according to various embodiments of the disclosure.

Referring to FIG. 1, interactive content 120 is created by processing a sequence 112 of original frames selected by a user from an original video 110. For example, the sequence 112 of the original frames may be acquired by capturing a specific segment of the video 110 from a time value of 1 second through a time value of 1.5 seconds. Processing the obtained sequence 112 of the original frames may include at least one of, for example, detecting background and animation regions, stabilizing the sequence of the original frames, and changing a position and a speed of the animation region. Herein, the animation region is a subset of image pixels within a frame which is individually played independently from other regions within the frame.

In the created interactive content 120, animation regions 122 and 124 may be activated independently. For example, the animation regions 122 and 124 may move or pause independently in response to a user's input signal, and playback speeds of the animation regions 122 and 124 may be changed. The animation regions 122 and 124 may be predetermined automatically or manually at the creation phase of the interactive content 120.

The created interactive content 120 may be edited selectively. For example, an amount, a shape, a default speed, and a background region of the animation regions 122 and 124 may be changed.

The interactive content 120 may be created easily (e.g., by simply capturing a short video) and interactively with the user, and may provide high definition while retaining cheap playback. For example, a reproduction method to be described may create a high-definition waterfall using only tens of captured frames which moves infinitely and never repeats. That is, the disclosure may create and reproduce high-definition content inexpensively.

The interactive content 120 may be automatically created from the sequence 112 of the original frames, and may be created in different formats such as two-dimensional (2D) content applied to a frame TV, animated picture content for an AR device, 360-degree video for a VR device, and 3D object content for a VR device.

The interactive content 120 for the display device (e.g., an AR device and a VR device) may be created by not only professionals but also general users. For example, the user who wears AR eyeglasses captures images of a moving object through the AR eyeglasses, and creates interactive content based on the captured images. Thus, the user wearing the AR eyeglasses may see the moving object through the AR eyeglasses even after the original object disappears from the user's view.

Figure 2:
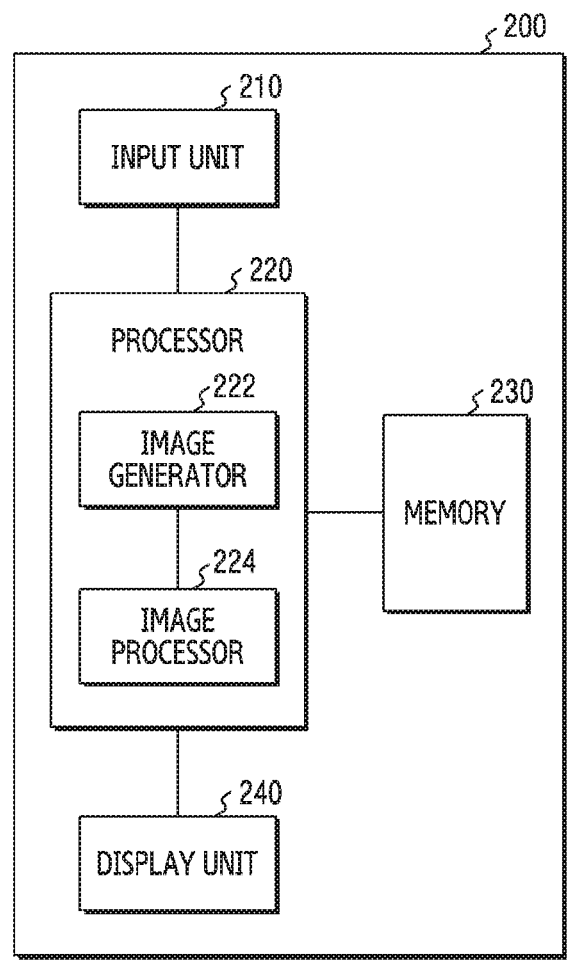
FIG. 2 illustrates an apparatus for creating and reproducing interactive content according to various embodiments of the disclosure.

FIG. 2 illustrates an apparatus for creating and reproducing interactive content according to various embodiments of the disclosure.

Referring to FIG. 2, an apparatus (hereafter, referred to as an electronic device) for creating and reproducing interactive content 200 may include an input unit 210, a processor 220, a memory 230, and a display unit 240.

The input unit 210 detects an external input (e.g., from the user). For example, the input unit 210 may identify an external command or data to be used by a component of the electronic device 200 (e.g., from the user). The input unit 210 may include, for example, a microphone, a mouse, a keyboard, a touchpad, a touch screen, or a digital pen (e.g., a stylus pen).

The processor 220 controls operations of the electronic device 200. For example, the processor 220 may control at least other components (e.g., hardware or software components) of the electronic device 200 connected with the processor 220 by executing software, and process various data and operations. According to an embodiment, as at least part of the data processing or the operation, the processor 220 may load a command or data received from another component to the memory 230, process the command or data stored in the memory 230, and store resulting data in the memory 230. According to an embodiment, the processor 220 may include a main processor (e.g., a central processing unit or an application processor) and an auxiliary processor (e.g., a graphics processing unit, an image signal processor, a sensor hub processor, or a communication processor) which is operable independently from, or in conjunction with, the main processor. Additionally or alternatively, the auxiliary processor may be adapted to consume less power than the main processor, or to perform a specified function. The auxiliary processor may be implemented separate from, or as part of the main processor.

The auxiliary processor may control at least some functions or states related to at least one of the components of the electronic device 200, instead of the main processor 21 while the main processor is inactive (e.g., sleeping), or together with the main processor while the main processor is active (e.g., executing an application). According to an embodiment, the auxiliary processor (e.g., an image signal processor or a communication processor) may be implemented as part of another component that is functionally related to the designated function of the auxiliary processor.

As shown in FIG. 2, the processor 220 may include an image generator 222 and an image processor 224. According to various embodiments, the image generator 222 may detect at least one animation region selected from animation regions, and generate an output sequence for the at least one selected animation region. Herein, the output sequence is a sequence of output frames. If playing the output sequence generated by the image generator 222, the image processor 224 may change a playback speed, and process to smoothly reproduce a border of the at least one animation region with seamless stitching. For example, the processor 220 may control to fulfill operations to be described according to various embodiments.

The memory 230 may store various data used by at least one component of the electronic device 200. The data may include, for example, software and input data or output data for a command related thererto. The memory 230 may include a volatile memory or a non-volatile memory.

The display unit 240 visually provides graphics and/or characters. The display unit 240 may visually provide information external to the electronic device 200 (e.g., to the user). The display unit 240 may include a display, a hologram device, or a projector and control circuitry to control a corresponding device. For example, the display unit 240 may include at least one of a liquid crystal display (LCD), a light emitting diode (LED), a light emitting polymer display (LPD), an organic LED (OLED), an active matrix OLED (AMOLED), or a flexible LED (FLED). According to an embodiment, the display unit 240 may include touch circuitry adapted to detect a touch, or sensor circuitry (e.g., a pressure sensor) adapted to measure an intensity of force incurred by the touch.

Figure 3:
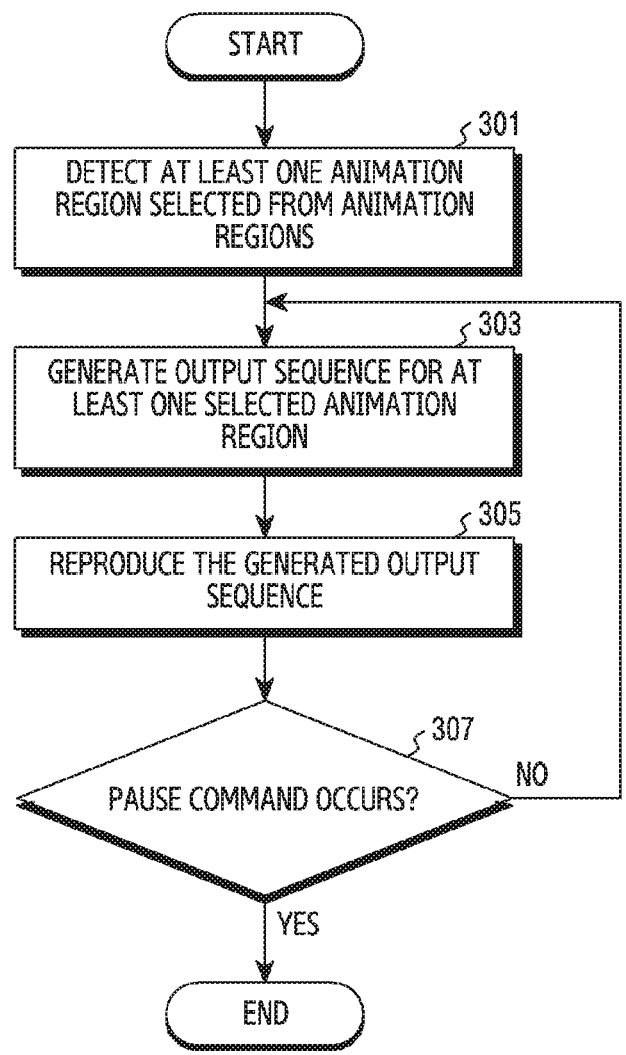
FIG. 3 illustrates a full flowchart of a method for creating and reproducing interactive content according to various embodiments of the disclosure.

FIG. 3 illustrates a flowchart of a method for creating and reproducing interactive content according to various embodiments of the disclosure. FIG. 3 illustrates an operating method of the electronic device 200.

Referring to FIG. 3, in operation 301, the electronic device detects at least one animation region selected from multiple animation regions. For example, in the interactive content 120 of FIG. 1, if the user selects one animation region from the animation regions 122 and 124 (see FIG. 1), the electronic device may detect that the animation region is selected.

In operation 303, the electronic device generates an output sequence for the at least one selected animation region from initial frames. Herein, each output frame may be a linear combination of the initial frames. That is, generating the output sequence may include selecting particular frames to combine at each timing from the initial frames, and determining a weight for each of the selected frames. More specifically, the electronic device may determine a plurality of random sequences for the at least one selected animation region, and generate the output sequence by applying weights to the determined random sequences. According to various embodiments, the electronic device may generate an infinite amount of the output sequence from the initial frames by using a combining frames algorithm.

In operation 305, the electronic device plays the generated output sequence. According to various embodiments, if the generated output sequence is reproduced, its playback speed may be changed using a video speed adjustment algorithm. The generated output sequence may be played with smooth transitions between animation regions through video processing.

In operation 307, the electronic device determines whether a pause command occurs. If the pause command occurs, the electronic device finishes this process. If the pause command does not occur, the electronic device returns to operation 303. The pause command may be input by a user through an input unit (e.g., the input unit 210), or may occur automatically if a specific time passes.

According to various embodiments, operation 303 and operation 305 may be executed at the same time or by stages, and generating and playing the output sequence may be repeated until the pause command is detected in operation 307. Hence, since a new output sequence may be generated and played infinitely from the initial frames, the output sequence has no visual loops and may play a video of good visual effect. Further, the user may turn on or off the animation regions independently, or interact with the content by changing their playback speed.

Figure 4:
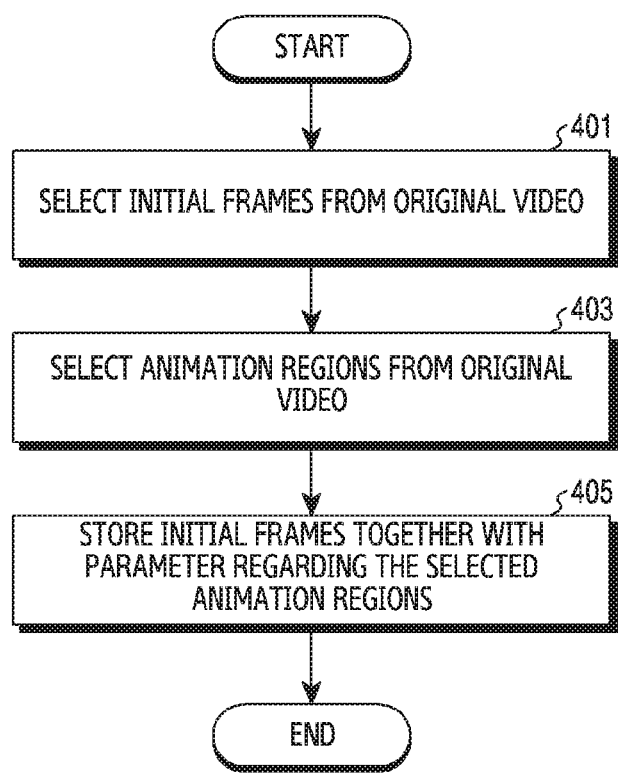
FIG. 4 illustrates a flowchart of a method for creating interactive content according to various embodiments of the disclosure.

Now, the method for creating and reproducing interactive content of FIG. 3 according to various embodiments of the disclosure is described by referring to FIG. 4.

FIG. 4 illustrates a flowchart of a method for creating interactive content according to various embodiments of the disclosure.

Referring to FIG. 4, in operation 401, initial frames are selected from an original video. For example, the user captures a video segment of a specific time from the original video. The video segment of the specific time (e.g., 1 through 1.5 seconds) may be automatically selected from the original video. The video segment of the specific time may be captured from the original video with a 360-degree camera or a 3D camera, and the captured video may be used as a 360-degree background on a VR device or as a 3D object on a VR device.

In operation 403, a plurality of animation regions is selected from the original video. For example, the user may select the animation regions from the original video, or the animation regions may be selected automatically. The animation regions may be selected automatically using well-known algorithms of motion detection. A well-established computer-vision algorithm may be generally used to detect still background parts of the video. Operation 403 may be simplified because the original video includes the background region.

In operation 405, the set of selected initial frames is stored together with a parameter regarding the selected animation regions. Herein, the parameter regarding the animation regions include position, speed, and shape information of the animation region as well as background information.

According to various embodiments, the initial frames may be obtained from a source other than a short video. For example, the video may capture a flower over the course of a day with a very low frame per second (fps), or capture a series of tree images at different seasons. Also, the initial frames may be arbitrarily selected by a designer.

Further, the well-established video stabilization algorithm may be applied to the selected initial frames. For example, if gyroscope data is available, gyroscope-based video stabilization may be conducted.

Figure 5:
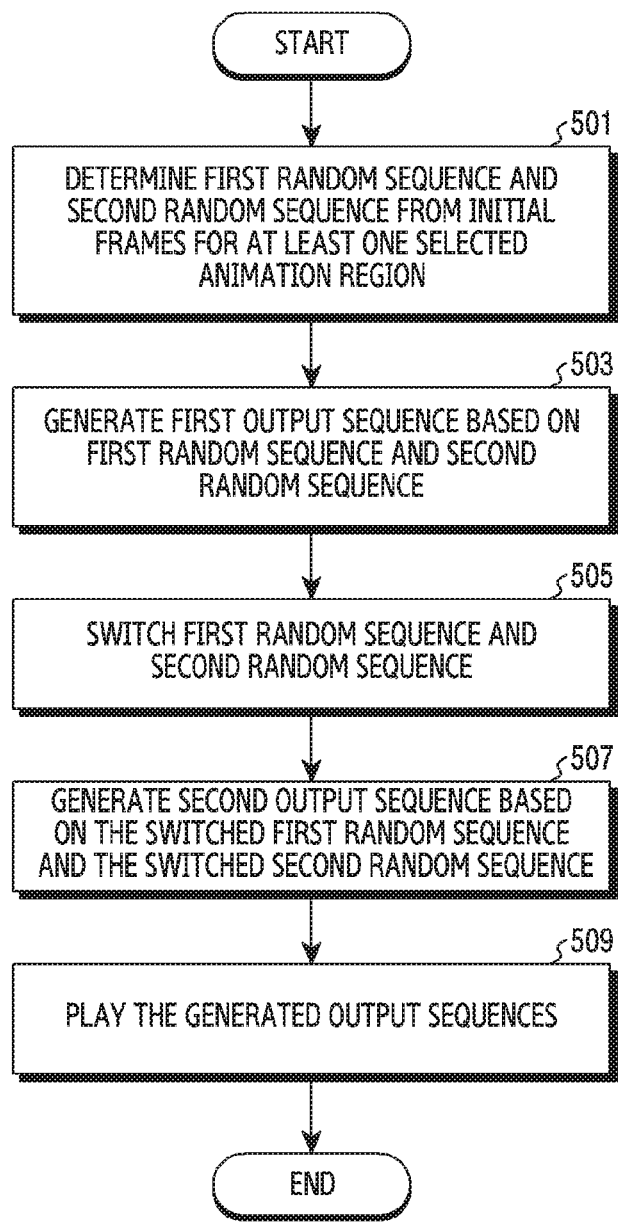
FIG. 5 illustrates a flowchart of a method for reproducing interactive content according to various embodiments of the disclosure.

FIG. 5 illustrates a flowchart of a method for creating and reproducing interactive content according to various embodiments of the disclosure. FIG. 5 provides more detail regarding operation 303 for generating the output sequence of the at least one selected animation and operation 305 for playing the generated output sequence in FIG. 3.

Referring to FIG. 5, in operation 501, the electronic device determines a plurality of random sequences from initial frames with respect to at least one selected animation region. The random sequences may include a first random sequence and a second random sequence. For example, the initial frames are defined as $f_0, f_1, f_2, \ldots, f_{N-1}$. Herein, N denotes the number of available initial frames. The first random sequence may be a sequence of successive frames of length L/2 selected from the initial frames, and a first frame of the first random sequence may be selected at random. L is smaller than N which is the number of the available initial frames. The second random sequence may be a sequence of successive frames of length L selected from the initial frames, and a first frame of the second random sequence may be selected at random.

In operation 503, the electronic device generates a first output sequence based on the first random sequence and the second random sequence. Herein, each frame of the first output sequence may include a linear combination of the initial frames, and may be equal to the length of the first random sequence. That is, each frame of the first output sequence may include the linear combination of the initial frames by applying weights to the frames of the first random sequence and the second random sequence.

In operation 505, the electronic device switches (i.e., changes) the first random sequence and the second random sequence. Switching the first random sequence randomly switches a start frame of the first random sequence to another frame from the initial frames, and the first random sequence is then switched to include the successive frames of the other frame which is the new start frame. The first random sequence is still the same length as it was before the switch. Switching the second random sequence randomly switches a start frame of the second random sequence to another frame from the initial frames, and the second random sequence is then switched to include the successive frames of the other frame which is the new start frame. The second random sequence is still the same length as it was before the switch.

In operation 507, the electronic device generates a second output sequence based on the switched first random sequence and the switched second random sequence. As in operation 503, each frame of the second output sequence may include a linear combination of the initial frames by applying weights to the frames of the switched first random sequence and the switched second random sequence.

In operation 509, the electronic device plays the generated output sequences. According to various embodiments, the output sequences may be created and played concurrently, the output sequences may be played as soon as they are created, or the first output sequence and the second output sequence may be played after the second output sequence is generated.

The operations of FIG. 5 may be applied independently to the animation regions, and operation 505 may be repeated until a pause command occurs.

Generating the output sequences may generate linear combination information of the initial frames, that is, indexes of the weighted initial frames.

Figure 6:
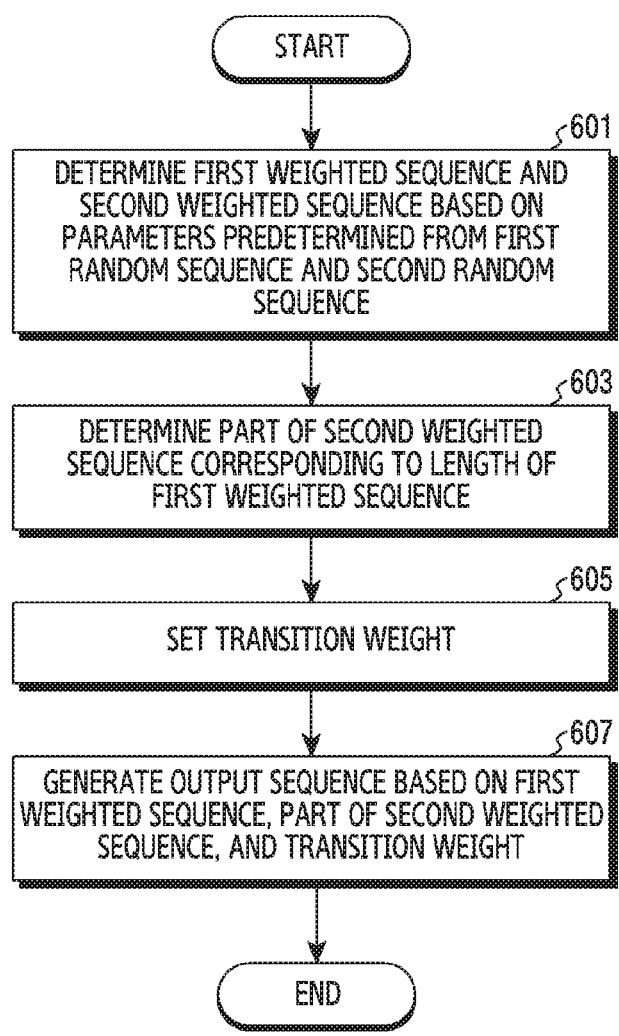
FIG. 6 illustrates a detailed flowchart of a method for generating an output sequence for interactive content according to various embodiments of the disclosure.

FIG. 6 illustrates a detailed flowchart of a method for generating an output sequence for interactive content according to various embodiments of the disclosure. FIG. 6 provides more detail regarding operation 503, operation 507, and operation 509 of FIG. 5.

Referring to FIG. 6, in operation 601, the electronic device determines a plurality of weighted sequences (e.g., a first weighted sequence and a second weighted sequence) based on predetermined parameters from a plurality of random sequences (e.g., a first random sequence and a second random sequence). Herein, the predetermined parameters may include playback speed information of initial frames. The first weighted sequence is a sequence of a linear combination by weighting the first random sequence. For example, the first weighted sequence may be a sequence of a linear combination of the initial frames outputted by using the first random sequence as the input of a video speed adjustment algorithm. A length of the first weighted sequence may be different from a length of the first random sequence. Likewise, the second weighted sequence may be a sequence of a linear combination by weighting the second random sequence, and the second weighted sequence may be different from a length of the second random sequence.

In operation 603, the electronic device determines a part of the second weighted sequence having a length that is the same as the length of the first weighted sequence. For example, if the length of the first weighted sequence is 6 and the length of the second weighted sequence is 13, the second weighted sequence is shortened to include only the first six frames. In other words, a shortest weighted sequence may be selected from the plurality of the weighted sequences, and the length of the remaining weighted sequences may be adjusted to correspond to the length of the selected shortest weighted sequence.

In operation 605, the electronic device sets a transition weight applied to the first weighted sequence and the determined part of the second weighted sequence. Herein, the transition weight is a weight used to generate the output sequence, and defined as, for example, w=t/n. w denotes the transition weight, t denotes a sequence number currently calculated, and n denotes the length of the calculated sequence.

In operation 607, the electronic device generates the output sequence based on the first weighted sequence, the determined part of the second weighted sequence, and the transition weight. Generating the output sequence in operation 607 shall be elucidated in FIG. 7.

The operations of FIG. 6 may be also applied to the switched first weighted sequence and the switched second weighted sequence in operation 507.

Figure 7:
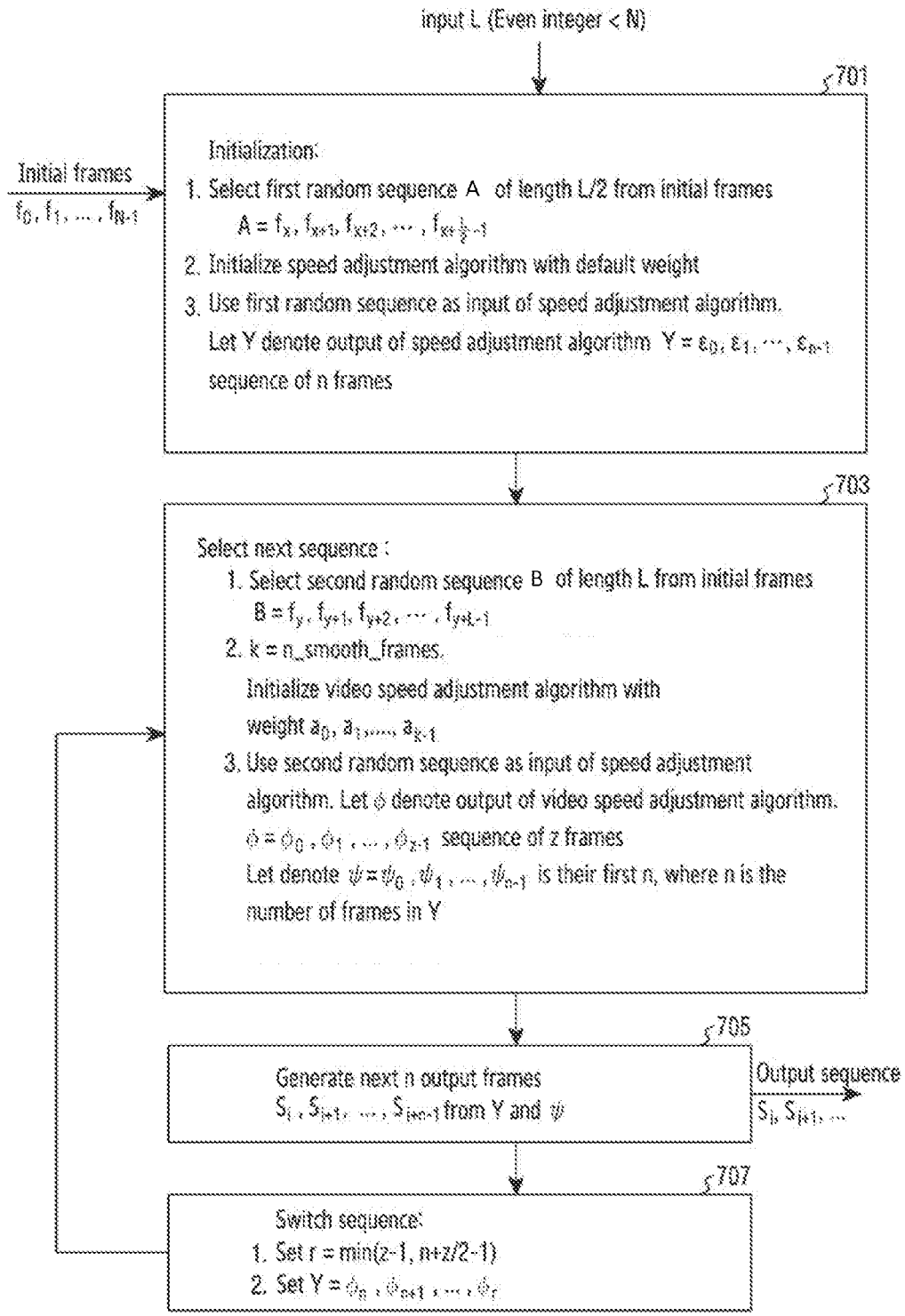
FIG. 7 illustrates an algorithm of interactive content reproduction according to various embodiments of the disclosure.

FIG. 7 illustrates an algorithm for creating interactive content according to various embodiments of the disclosure. The algorithm of FIG. 7 may be referred to as the combining frames algorithm.

Referring to FIG. 7, in operation 701, the electronic device receives initial frames (e.g., $f_0, f_1, f_2, \ldots, f_{N-1}$) and L, selects a random sequence A (e.g., $f_x, f_{x+1}, f_{x+2}, \ldots, f_{x+(L/2)-1}$) of length L/2 from the initial frames as a first random sequence, initializes the video speed adjustment algorithm with a default weight, and uses the first random sequence as an input of the video speed adjustment algorithm. As a result, the video speed adjustment algorithm outputs a first weighted sequence Y (e.g., $\varepsilon_0, \varepsilon_1, \ldots, \varepsilon_{n-1}$) which is a sequence of n frames. L corresponds to an even number smaller than the number of the inputted initial frames. The Y sequence may be a linear combination for part of $f_j, F_{j+1}, \ldots f_{j+n\_smooth\_frames-1}$. n_smooth_frames denotes a predetermined value for natural visual effect in the playback of the output sequence, and may be a unit for processing frames.

In operation 703, the electronic device selects a second random sequence B (e.g., $f_y, f_{y+1}, f_{y+2}, \ldots, f_{y+L-1}$) of length L from the initial frames, initializes the video speed adjustment algorithm with the weight (e.g., $a_0, a_1, \ldots, a_{k-1}$) for the Y sequence of the n frames outputted in operation 701, and uses the second random sequence as the input of the video speed adjustment algorithm. Here, k may be equal to n_smooth_frames. As a result, the video speed adjustment algorithm outputs a φ sequence (e.g., $\phi_0, \phi_1, \ldots, \phi_{z-1}$) of z frames. In the φ sequence of the z frames, a sequence ($\phi_0, \phi_1, \ldots, \phi_{n-1}$) corresponding to the sequence length of the n frames is determined as a ψ sequence (e.g., $\psi_0, \psi_1, \ldots, \psi_{n-1}$). The φ sequence of the z frames may correspond to the second weighted sequence, and the ψ sequence may correspond to the shortened part of the second weighted sequence. The length z of the φ sequence is greater than n, and may be two times n. The Y sequence and the ψ sequence may be applied to the same speed adjustment algorithm, and accordingly have the same weight.

In operation 705, the electronic device generates n output frames $S_i, S_{i+1}, \ldots, S_{i+n-1}$ from the Y sequence and the sequence. Operation 705 shall be elucidated in FIG. 8.

In operation 707, the electronic device switches the first random sequence and the second random sequence. r is set to a smaller one of z−1 and n+(z/2)−1. The Y sequence is set to a sequence $\phi_n, \phi_{n+1}, \ldots, \phi_r$ from n to r in the φ sequence of the z frames.

FIG. 8 provides more detail regarding operation 705 in the algorithm for reproducing interactive content according to various embodiments of the disclosure.

Referring to FIG. 8, for example, a Y sequence may include $\varepsilon_0, \varepsilon_1, \ldots, \varepsilon_{n-1}$, and a ψ sequence may include $\psi_0, \psi_1, \ldots, \psi_{n-1}$. The element $\varepsilon_t$ of the Y sequence is a linear combination of k initial frames, and may be equal to $$\varepsilon_t = \sum_{i=0}^{k-1} w_i(t) * f_{A+t+i}.$$

The element $\psi_t$ of the ψ sequence is a linear combination of k initial frames, and may be equal to $$\psi_t = \sum_{i=0}^{k-1} w_i(t) * f_{B+t+i}.$$

The electronic device determines the output sequence based on Equation 1.

$$S_t = \sum_{i=0}^{r(t)-1} w_i(t) * f_{B+i} + (w_{r(t)} - \Delta) * f_{B+r(t)} + \Delta * f_{A+r(t)} + \sum_{i=r(t)+1}^{k-1} w_i(t) * f_{A+i} \quad (1)$$

S denotes the output sequence, r(t) denotes the minimum number which satisfies $$\sum_{i=0}^{r(t)} w_i(t) \geq w,$$

w denotes the transition weight which is set to t/n, t denotes a sequence number from 0 to n−1, i denotes a current sequence number, $f_A$ denotes the first frame of the first random sequence, $f_B$ denotes the first frame of the second random sequence, k denotes n_smooth_frames, and Δ denotes $$\sum_{i=0}^{r(t)} w_i(t) - w.$$

Figure 9:
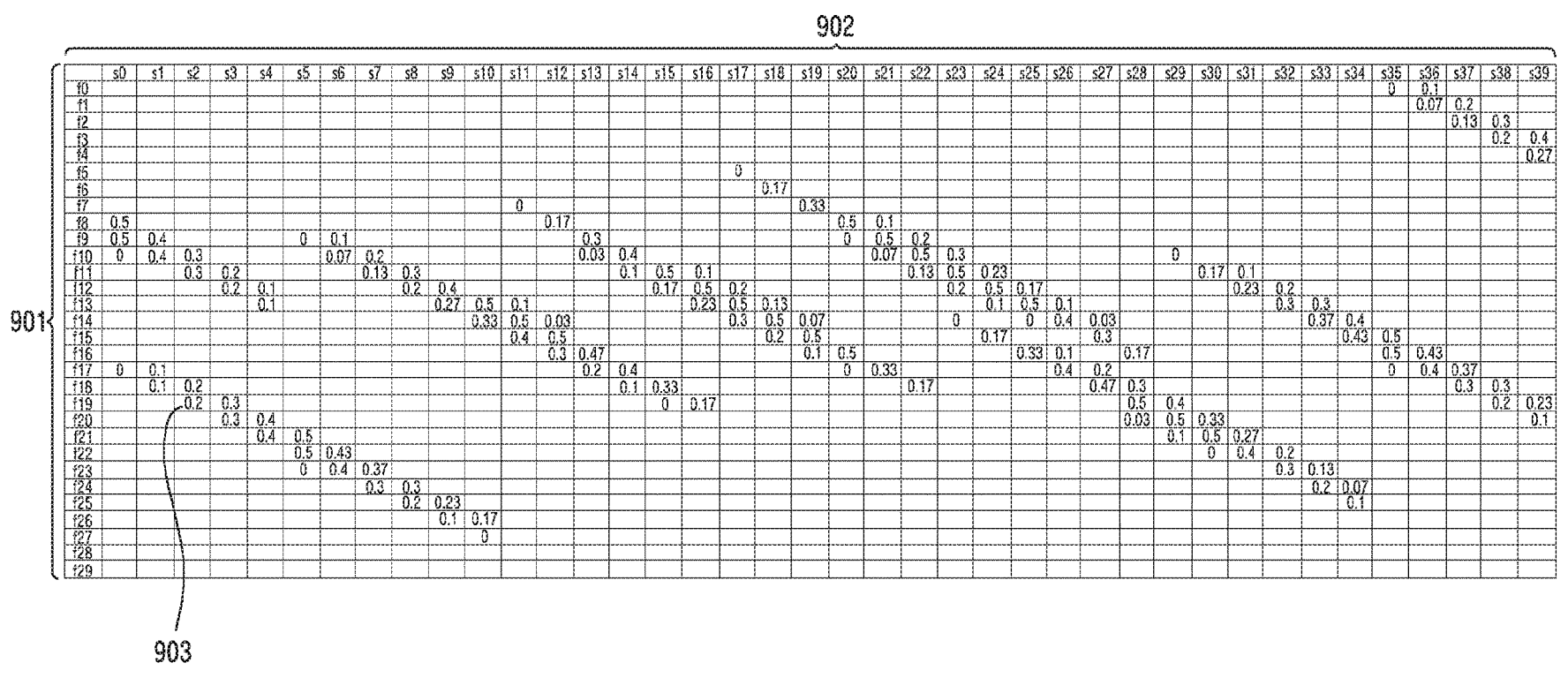

FIG. 9 depicts a table of an output sequence generated in interactive content reproduction according to various embodiments of the disclosure. FIG. 9 depicts the output sequence generated in operations of FIG. 7.

In FIG. 9, initial frames 901, an output sequence 902 generated, and weights 903 are shown. Referring to FIG. 7 and FIG. 9, in operation 701, if 12 for L is inputted to the electronic device and 30 initial frames are inputted, a first random sequence (e.g., $f_8 \sim f_{13}$) corresponding to the length L/2, that is, the length 6 is selected. The electronic device inputs the first random sequence to the speed adjustment algorithm and thus outputs the Y sequence of the length 5.

In operation 703, a second random sequence (e.g., $f_{17} \sim f_{28}$) corresponding to the length L, that is, the length 12 is selected. The electronic device inputs the second random sequence to the speed adjustment algorithm and thus outputs the φ sequence of the length 13. In so doing, first five elements of the φ sequence are determined as the ψ sequence $\phi_0 \sim \phi_4$.

In operation 705, five output frames are generated from the Y sequence and the ψ sequence based on Equation 1. That is, $s_0=0.5*f_8+0.5*f_9$, $s_1=0.4*f_9+0.4*f_{10}+0.1*f_{17}+0.1*f_{18}$, $s_2=0.3*f_{10}+0.3*f_{11}+0.2*f_{18}+0.2*f_{19}$, $s_3=0.2*f_{11}+0.2*f_{12}+0.3*f_{19}+0.3*f_{20}$, and $s_4=0.1*f_{12}+0.1*f_{13}+0.4*f_{20}+0.4*f_{21}$ are generated.

In operation 707, the electronic device switches the Y sequence to next six sequences $\phi_5 \sim \phi_{10}$ of the ψ sequence $\phi_0 \sim \phi_4$. As aforementioned, the Y sequence is set to the sequence $\phi_n, \phi_{n+1}, \ldots, \phi_r$ from n to r in the φ sequence. That is, since r is the smaller one of z−1 and n+(z/2)−1, r is set to 10 which is the smaller one of 12−1=11 and 5+12/2−1=10, and corresponds to n=5 and accordingly the Y sequence is switched to $\phi_5 \sim \phi_{10}$.

The second random sequence (e.g., $f_9 \sim f_{20}$) is switched, and the electronic device inputs the second random sequence to the speed adjustment algorithm to thus output the φ sequence of the length 13. At this time, the ψ sequence is switched to the first six elements $\phi_0 \sim \phi_5$ of the φ sequence to correspond to the switched Y sequence.

Based on Equation 1, the output sequence of next six frames ($s_5 \sim s_{10}$) is generated from the switched Y sequence and the switched ψ sequence. As shown in FIG. 9, the next output sequence is generated as $s_5=0.5*f_{21}+0.5*f_{22}$ and $s_6=0.1*f_9+0.07*f_{10}+0.43*f_{22} f+0.4*f_{23}$ etc.

Figure 10:
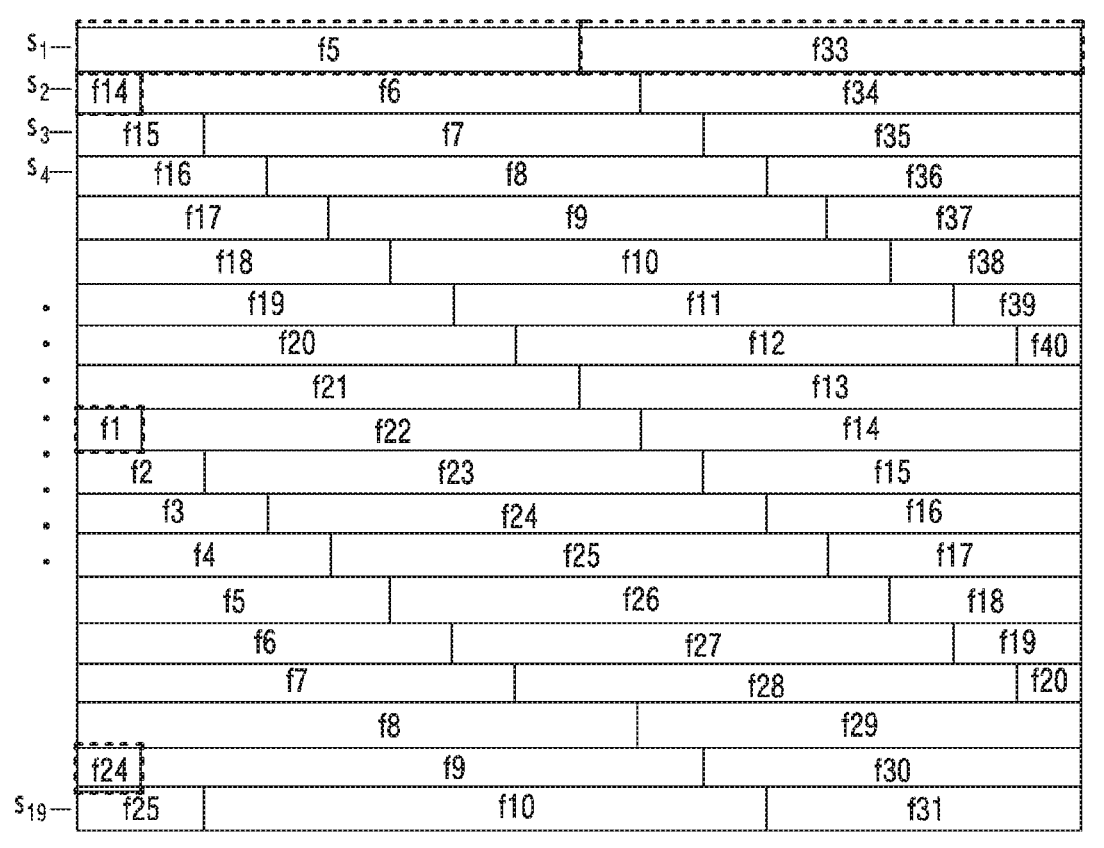

FIG. 10 illustrates another output sequence generated in interactive content reproduction according to various embodiments of the disclosure. FIG. 10 depicts the output sequence generated in operations of FIG. 7.

Referring to FIG. 10, one row indicates one output sequence generated, and initial frames $f_5$, $f_{33}$, $f_{14}$, $f_1$, and $f_{24}$ are randomly determined. Such an output sequence may be generated as shown in FIG. 9.

Hence, the interactive content reproduction does not consume more power than reproduction of an uncompressed video of the same size as the sum of sizes of the animation regions of the interactive content. Playback memory consumption may not exceed 40 frames loaded in the memory (in fact may be less because an immovable background is loaded only once). In addition, the interactive content enables efficient implementation of the playback algorithm, and the size of the compressed content is acquired by adding the compressed video size (about 40 frames) and some service information. Considering that the content mostly includes the immovable background, the size is relatively smaller than other content (e.g., about 5-10 Mb for full high definition (HD) quality).

Figure 11:
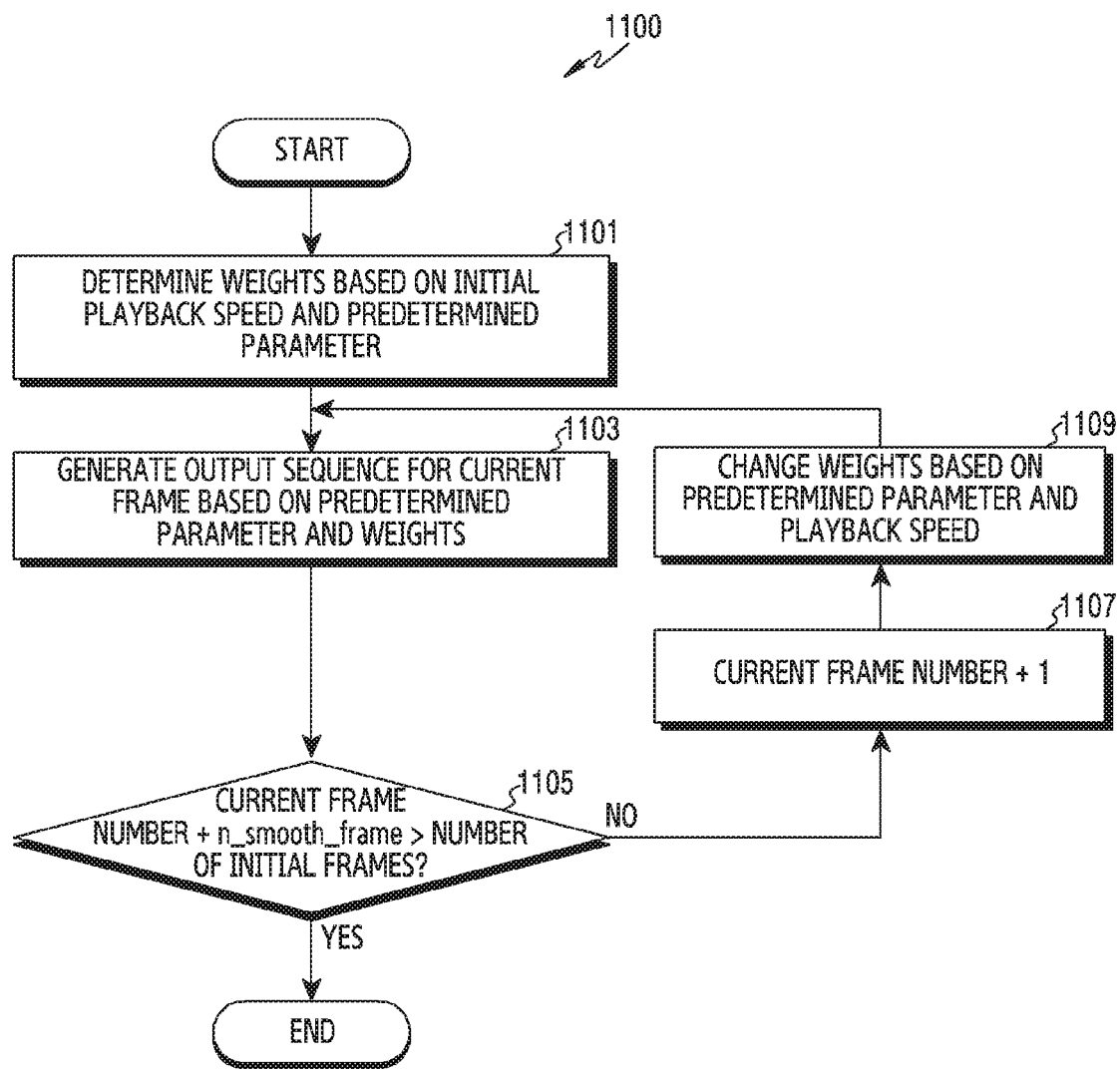
FIG. 11 illustrates a flowchart of a method for changing a playback speed in interactive content reproduction according to various embodiments of the disclosure.

FIG. 11 illustrates a flowchart of a method for changing a playback speed in interactive content reproduction according to various embodiments of the disclosure. The method for changing the playback speed of FIG. 11 may adopt the video speed adjustment algorithm.

Referring to FIG. 11, in operation 1101, the electronic device determines weights based on an initial playback speed and a predetermined parameter. Herein, the predetermined parameter may be k, which is equal to n_smooth_frames. The initial playback speed may be determined by the user, or may be a playback speed of an original video. n_smooth_frames is a constant, and may be defined by the user or determined by the playback speed. While the playback speed determines the visual playback speed of the output sequence, n_smooth_frames determines smoothness of the output sequence. As n_smooth_frames increases, more fluent interactive content may be created in low-speed playback at the cost of a lower blur.

In operation 1103, the electronic device generates an output sequence for a current frame based on the predetermined parameter and the determined weights. Herein, if the output sequence is played at the same frame rate as a sequence of input frames, the interactive content may ultimately have the same visual speed as the original speed. For example, if the playback speed is set to 0.4, the interactive content is 2.5 times slower than the original. If the playback speed is set to 1.5, the interactive content is 1.5 times faster than the original.

In operation 1105, the electronic device determines whether the sum of the current frame number and n_smooth_frames exceeds the number of the initial frames. If the sum of the current frame number and n_smooth_frames does not exceed the number of the initial frames, the electronic device goes to operation 1107.

The electronic device increases the current frame number by one in operation 1107, and changes the weights based on the predetermined parameter and the playback speed in operation 1109. In so doing, the playback speed may change, and if the playback speed is changed, the weights are changed based on the changed playback speed and the predetermined parameter. Hence, other frames after the playback speed change have a different visual playback speed.

If the sum of the current frame number and n_smooth_frames exceeds the number of the initial frames, the electronic device finishes the playback speed changing process.

Figure 12:
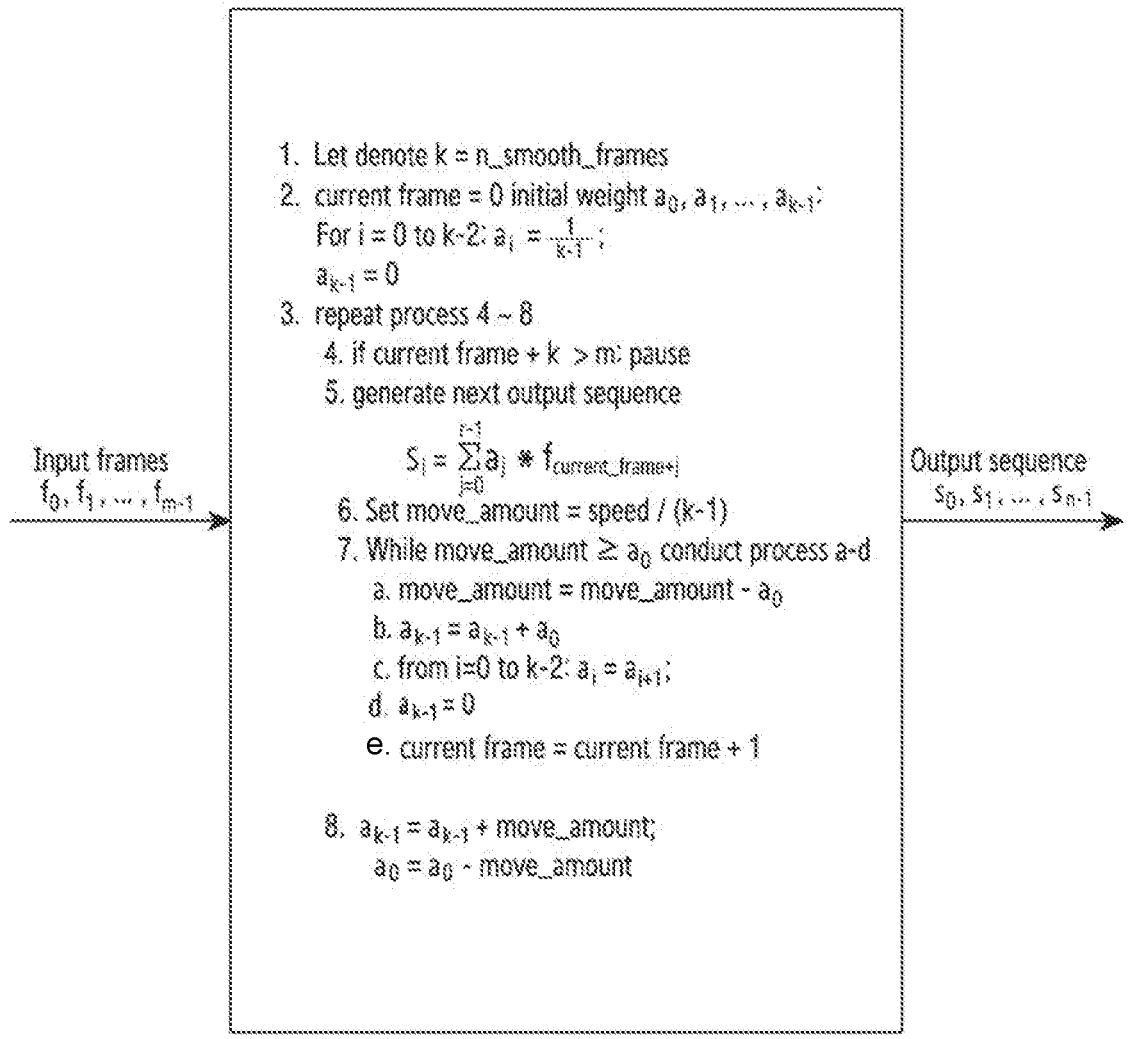
FIG. 12 illustrates an algorithm of a method for changing a playback speed in interactive content reproduction according to various embodiments of the disclosure.

FIG. 12 illustrates an algorithm of a method for changing a playback speed in interactive content reproduction according to various embodiments of the disclosure. FIG. 13 illustrates an output sequence if a playback speed of interactive content is changed according to various embodiments of the disclosure. The algorithm for changing the playback speed of FIG. 12 may be the video speed adjustment algorithm.

Referring to FIG. 12, n_smooth_frames may be an integer greater than 2, and the playback speed is greater than 0. For example, n_smooth_frames=3 and speed=0.8 may be input. Input frames are $f_0, f_1, f_2, \ldots, f_{m-1}$, and if these m input frames are input to the algorithm, the algorithm generates an output sequence of n frames $s_0, s_1, \ldots, s_{n-1}$.

An output order of the frames may store the same visual information as the input order of the frames, and the length n of the output sequence may be different from the length m of the input frames. For example, if speed=0.4, the length n of the output sequence may be about 2.5 times greater than the length m of the input frames.

The value k is set to n_smooth_frames. Next, a current frame number value is set to 0, initial weights $a_0, a_1, \ldots, a_{k-1}$ are determined from i=0 to k-2 based on Equation 2, and $a_{k-1}$ is determined as 0.

$$a_i = \frac{1}{k-1} \quad (2)$$

a denotes the weight, and k denotes n_smooth_frames.

Next, the following is repeated until sum of the current frame number and the value k exceeds the number of the initial frames. The output sequence is generated based on Equation 3.

$$S_i = \sum_{j=0}^{r-1} a_j * f_{current\_frame+j} \quad (3)$$

s denotes the output sequence, a denotes the weight, and k denotes n_smooth_frames. move_amount is set to the playback speed/(k−1).

Next, the electronic device determines whether move_amount exceeds $a_0$, and repeats the following process if move_amount exceeds $a_0$.

move_amount is changed to a value produced by subtracting $a_0$ from move_amount, and the weight $a_{k-1}$ is changed to $a_{k-1}+a_0$, i is changed from 0 to k−2, $a_i$ is changed to $a_{i+1}$, and the current frame number is increased by 1. Lastly, $a_0$ is set to $a_0$−move_amount, and $a_{k-1}$ is set to $a_{k-1}$+move_amount.

The output sequence generated by the video speed adjustment algorithm is generated as shown in FIG. 13. Referring to FIG. 13, initial frames 1301, an output sequence 1302, and a weight 1303 are shown, and input parameters are set to playback speed=0.4 and n_smooth_frames=3. In so doing, the output sequence frame $s_0$ is $s_0=0.5*f_0+0.5*f_1+0.0*f_3$, and the output sequence frame $s_4$ is $s_4=0.4*f_1+0.5*f_2+0.1*f_3$. Since the initial frame $f_5$ first appears in $s_8$ and the initial frame $f_7$ first appears in $s_{13}$, speed=(7−5)/(13−8)=0.4 of original speed may be verified.

Figure 14:
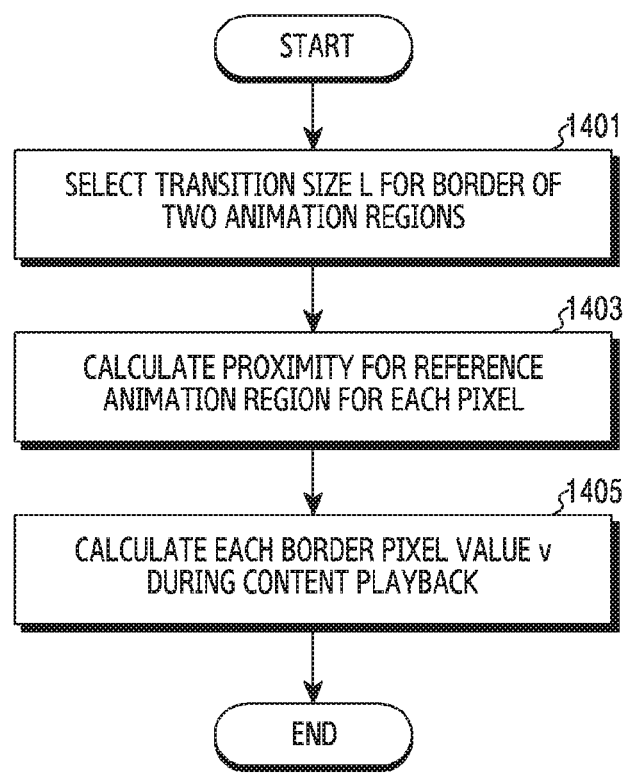
FIG. 14 illustrates a method for processing a border between animation regions of interactive content according to various embodiments of the disclosure.

FIG. 14 illustrates a method for processing a border between animation regions of interactive content according to various embodiments of the disclosure. The method of FIG. 14 may be applied to a plurality of animation regions, and two animation regions A and B are assumed.

Referring to FIG. 14, in operation 1401, the electronic device selects a transition size for a border of the two animation regions. Herein, the transition size may be L, and playback speeds of the animation regions may be the same or different. For example, L may be set to 8 pixels.

In operation 1403, the electronic device calculates proximity of a pixel with respect to a reference animation region A and another animation region B adjacent to A. The proximity value of a pixel with respect to animation regions A and B is the ratio of the number of pixels inside the intersection of animation region A and a circle C of radius L (the transition size) centered at the pixel and the number of pixels inside the intersection of animation region B and circle C. Such calculation may be performed during the output sequence generation.

In operation 1405, the electronic device calculates each border pixel value during the content playback. Herein, the value of each border pixel P with a proximity value of proximity(P) may be indicated as v(P) and calculated based on Equation 4.

$$v(P)=\text{proximity}(P)*p_A(P)+(1-\text{proximity}(P))*p_B(P) \quad (4)$$

$p_A(P)$ and $p_B(P)$ are proximity values of the pixel P with respect to the animation regions A and B acquired by the combining playback algorithm described above.

The longer sequence length L gives smoother transition between the sequences, and accordingly little stitch may be observed in the interactive content. Meanwhile, L must be much smaller than the amount N of the initial frames. This may give diversity to the second random sequence which is newly selected at random.

Image sharpness of the created interactive content is almost uniform during the playback, overall image reproduction gets smoother, and the playback speed may be changed.

As set forth above, the apparatus and the method according to various embodiments of the disclosure may achieve interactivity (switching/releasing the moving region, changing the playback speed of each region) and infinite playback with seamless stitching by repeatedly generating and playing a new output sequence from the initial frames, and improve user's immersion experience.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network such as Internet, Intranet, local area network (LAN), wide LAN (WLAN), or storage area network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for reproducing frames in an electronic device, comprising:
   detecting at least one animation region from among a plurality of animation regions;
   determining a plurality of random sequences of frames for the at least one animation region;
   determining respective weights for a plurality of original frames based on a playback speed and a predetermined parameter;
   applying the respective weights to random sequences of frames from among the determined plurality of random sequences of frames;
   generating an output sequence of frames based on the weighted random sequences of frames; and
   reproducing the generated output sequence of frames.

2. The method of claim 1, wherein the generating the output sequence of frames comprises:
   changing the determined plurality of random sequences of frames based on switching respective start frames of each random sequence of frames from among the determined plurality of random sequences of frames to a frame of another random sequence of frames; and
   generating another output sequence of frames based on the plurality of changed random sequences of frames.

3. The method of claim 1, wherein the generating the output sequence of frames comprises:
   determining a plurality of weighted sequences based on predetermined parameters from the determined plurality of random sequences of frames;
   setting respective transition weights for each weighted sequence from among the determined plurality of weighted sequences; and
   generating the output sequence based on the determined plurality of weighted sequences and the respective transition weights.

4. The method of claim 3, wherein the generating the output sequence based on the determined plurality of weighted sequences and the respective transition weights comprises:
   selecting a shortest weighted sequence from among the determined plurality of weighted sequences; and
   adjusting respective lengths of the determined plurality of weighted sequences to correspond to a length of the selected shortest weighted sequence.

5. The method of claim 1, wherein the generating the output sequence of frames comprises
   generating the output sequence of frames based on the predetermined parameter and the weights.

6. The method of claim 5, further comprising:
   determining whether a sum of a current frame number and the predetermined parameter exceeds a total number of the plurality of original frames, the current frame number corresponding to an output frame currently being generated;
   in response to determining that the sum of the current frame number and the predetermined parameter is less than or equal to the total number of the plurality of original frames, increasing the current frame number by one;
   changing the determined weights based on the predetermined parameter and the playback speed; and
   generating an output frame corresponding to the current frame number increased by one based on the predetermined parameter and the changed weights.

7. The method of claim 5, further comprising:
   in response to being changed the playback speed, changing the weights for the plurality of original frames based on the changed playback speed and the predetermined parameter.

8. The method of claim 1, wherein the reproducing the generated output sequence comprises:
   selecting two animation regions including a common border from among the plurality of animation regions;
   determining a pixel value at the common border of the two selected animation regions while the generated output sequence of frames is reproduced; and
   reproducing the generated output sequence of frames based on the determined pixel value.

9. The method of claim 8, wherein the determining the pixel value at the common border of the two selected animation regions while the generated output sequence of frames is reproduced comprises:
   selecting a transition size for the two selected animation regions;
   determining respective proximity values for each pixel at the common border of the two selected animation regions; and
   determining respective pixel values for each pixel at the common border of the two selected animation regions while the generated output sequence of frames is reproduced based on the determined proximity values,
   wherein each of the proximity values is a ratio of a number of pixels inside a circle centered at the pixel that belong to one of the two selected animation regions to a number of pixels inside the circle that belong to the other of the two selected animation regions.

10. The method of claim 1, wherein playback of the selected at least one animation region is turned on/off by a user.

11. An electronic device for reproducing frames, comprising:
    a display unit; and
    at least one processor connected to the display unit,
    wherein the at least one processor is configured to:
       detect at least one animation region selected from among a plurality of animation regions,
       determine a plurality of random sequences of frames for the at least one selected animation region,
       determine weights for a plurality of original frames based on a playback speed and a predetermined parameter,
       apply the respective weights to random sequences of frames from among the determined plurality of random sequences of frames,
       generate an output sequence of frames based on the weighted random sequences, and
       reproduce the generated output sequence of frames.

12. The electronic device of claim 11, wherein the at least one processor is further configured to:
    change the determined plurality of random sequences of frames based on switching respective start frames of each random sequence of frames from among the determined plurality of random sequences of frames to a frame of another random sequence of frames, and
    generate another output sequence of frames based on the plurality of changed random sequences of frames.

13. The electronic device of claim 11, wherein the at least one processor is configured to:

determine a plurality of weighted sequences based on predetermined parameters from the determined plurality of random sequences of frames, set respective transition weights for each weighted sequence from among the determined plurality of weighted sequences, and generate the output sequence of frames based on the determined plurality of weighted sequences and the respective transition weights.

14. The electronic device of claim 13, wherein the at least one processor is configured to:

select a shortest weighted sequence from among the determined plurality of weighted sequences, and adjust respective lengths of the determined plurality of weighted sequences to correspond to a length of the selected shortest weighted sequence.

15. The electronic device of claim 11, wherein the at least one processor is configured to generate the output sequence of frames based on the predetermined parameter and the weights.

16. The electronic device of claim 15, wherein the at least one processor is configured to determine whether a sum of a current frame number and the predetermined parameter exceeds a total number of the initial frames, in response to determining that the sum of the current frame number and the predetermined parameter is less than or equal to the total number of the initial frames, to increase the current frame number by one, to change the weights based on the predetermined parameter and the playback speed, and to generate an output frame corresponding to the current frame number increased by one based on the predetermined parameter and the changed weights.

17. The electronic device of claim 15, wherein the at least one processor is configured to, in response to being changed the playback speed, change weights for the initial frames based on the changed playback speed and the predetermined parameter.

18. The electronic device of claim 11, wherein the at least one processor is configured to:

select two animation regions including a common border from among the plurality of animation regions, determine a pixel value at the common border of the two selected animation regions while the generated output sequence is reproduced, and reproduce the generated output sequence of frames based on the determined pixel value.

19. The electronic device of claim 18, wherein the at least one processor is configured to:

select a transition size for the two selected animation regions, determine a proximity value for the two selected animation regions, and determine the pixel value at the common border of the two selected animation regions while the generated output sequence of frames is reproduced based on the determined proximity value, wherein the proximity value is a ratio of a number of pixels inside a first circle centered at the pixel that belong to one of the two selected animation regions to a number of pixels inside the circle that belong to the other of the two selected animation regions.

20. The electronic device of claim 11, wherein the at least one processor is configured to control reproduction of the selected at least one animation region to be turned on/off by a user.

* * * * *